United States Patent
Dinger et al.

(10) Patent No.: US 10,180,176 B2
(45) Date of Patent: Jan. 15, 2019

(54) TURBINE TORSIONAL VIBRATION DAMPER, AND CONVERTER AND TORQUE TRANSMISSION DEVICE

(71) Applicant: Schaeffler Technologies AG & Co. KG, Herzogenaurach (DE)

(72) Inventors: Christian Dinger, Lauf (DE); Jan Hoffmann, Rastatt (DE); Christian Huegel, Rheinau (DE)

(73) Assignee: Schaffler Technologies AG & Co. KG, Herzogenaurach (DE)

( * ) Notice: Subject to any disclaimer, the term of this patent is extended or adjusted under 35 U.S.C. 154(b) by 270 days.

(21) Appl. No.: 14/907,175

(22) PCT Filed: Jul. 14, 2014

(86) PCT No.: PCT/DE2014/200317
§ 371 (c)(1),
(2) Date: Jan. 22, 2016

(87) PCT Pub. No.: WO2015/010698
PCT Pub. Date: Jan. 29, 2015

(65) Prior Publication Data
US 2016/0178030 A1    Jun. 23, 2016

(30) Foreign Application Priority Data

Jul. 26, 2013 (DE) .......... 10 2013 214 688
Aug. 14, 2013 (DE) .......... 10 2013 216 119
Nov. 11, 2013 (DE) .......... 10 2013 222 873

(51) Int. Cl.
F16H 45/02    (2006.01)
F16F 15/14    (2006.01)
F16D 3/12    (2006.01)

(52) U.S. Cl.
CPC .......... *F16F 15/145* (2013.01); *F16D 3/12* (2013.01); *F16H 45/02* (2013.01);
(Continued)

(58) Field of Classification Search
CPC .......... F16F 15/145; F16H 2045/0221; F16H 2045/0247; F16H 2045/0263
(Continued)

(56) References Cited

U.S. PATENT DOCUMENTS 6,026,940 A    2/2000    Sudau
8,490,766 B2    7/2013    Maienschein et al.
(Continued)

FOREIGN PATENT DOCUMENTS

CN    102105712    6/2011
CN    102414041    4/2012
(Continued)

*Primary Examiner* — Thomas E Lazo
*Assistant Examiner* — Daniel S Collins
(74) *Attorney, Agent, or Firm* — Brooks Kushman P.C.

(57) ABSTRACT

A turbine torsional vibration damper, in particular a simple torsional vibration damper, for a vehicle, preferably for a drivetrain of a motor vehicle, having a damper part for introducing a torque into the turbine torsional vibration damper and a damper part for extracting the torque from the torsional vibration damper, wherein a pendulum mass flange of a centrifugal pendulum device is rigidly coupled mechanically with a damper part of the turbine torsional vibration damper. A converter or a torque transmission device for a vehicle, in particular for a drivetrain of a motor vehicle, wherein the converter or torque transmission device has a turbine torsional vibration damper according to the invention.

18 Claims, 8 Drawing Sheets

(52) U.S. Cl.
CPC ............... *F16H 2045/0205* (2013.01); *F16H 2045/0226* (2013.01); *F16H 2045/0263* (2013.01); *F16H 2045/0294* (2013.01)

(58) Field of Classification Search
USPC .......................................................... 60/338
See application file for complete search history.

(56) References Cited

U.S. PATENT DOCUMENTS

| | | | |
|---|---|---|---|
| 8,561,499 B1 * | 10/2013 | Schiemann | F16F 15/30 188/378 |
| 2012/0111684 A1 | 5/2012 | Kombowski et al. | |
| 2012/0305358 A1 * | 12/2012 | Maienschein | F16F 15/145 192/3.28 |

FOREIGN PATENT DOCUMENTS

| | | |
|---|---|---|
| CN | 102762889 | 10/2012 |
| DE | 19804227 A1 | 8/1999 |
| DE | 102011010344 A1 | 8/2011 |

* cited by examiner

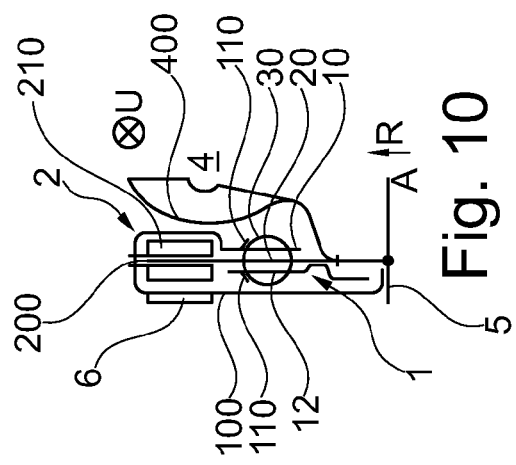
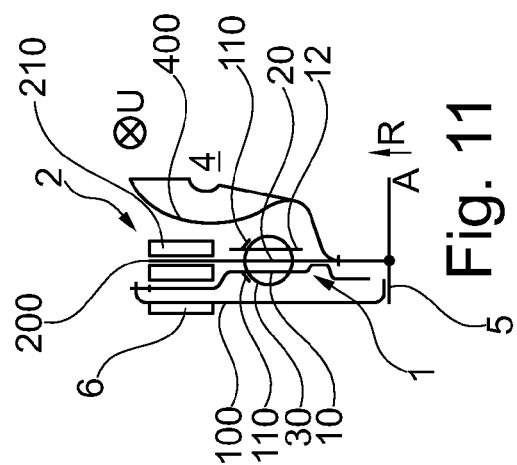
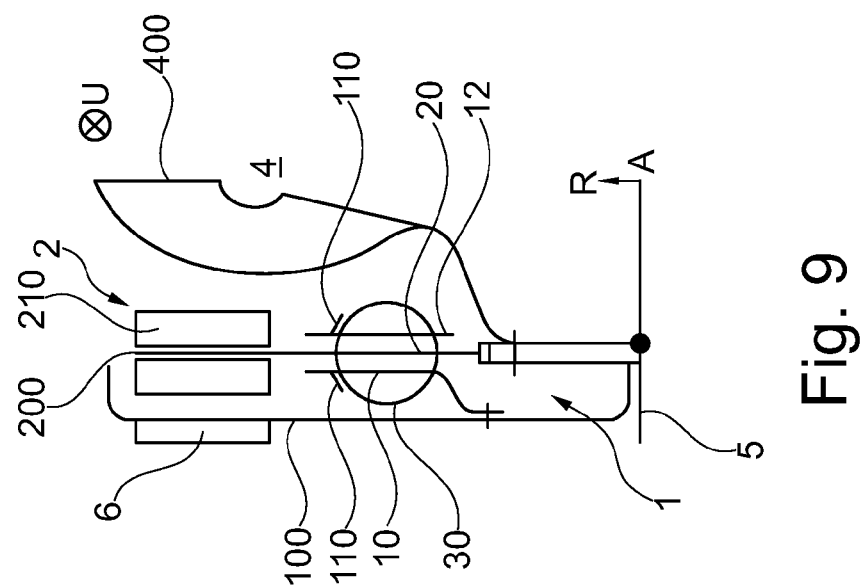

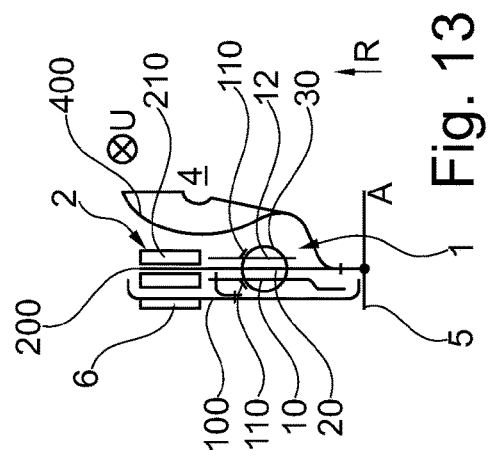
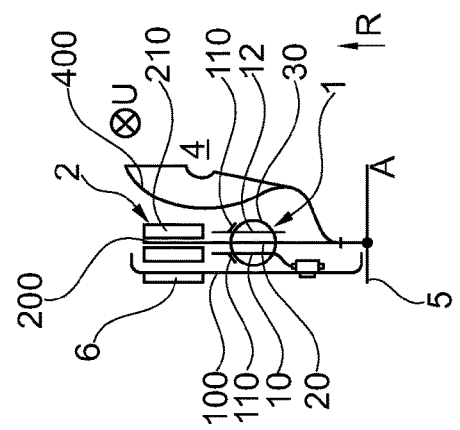
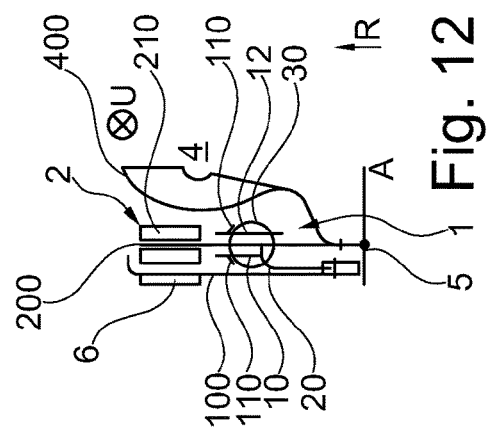
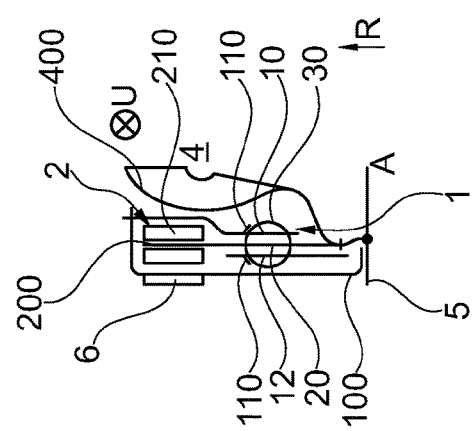

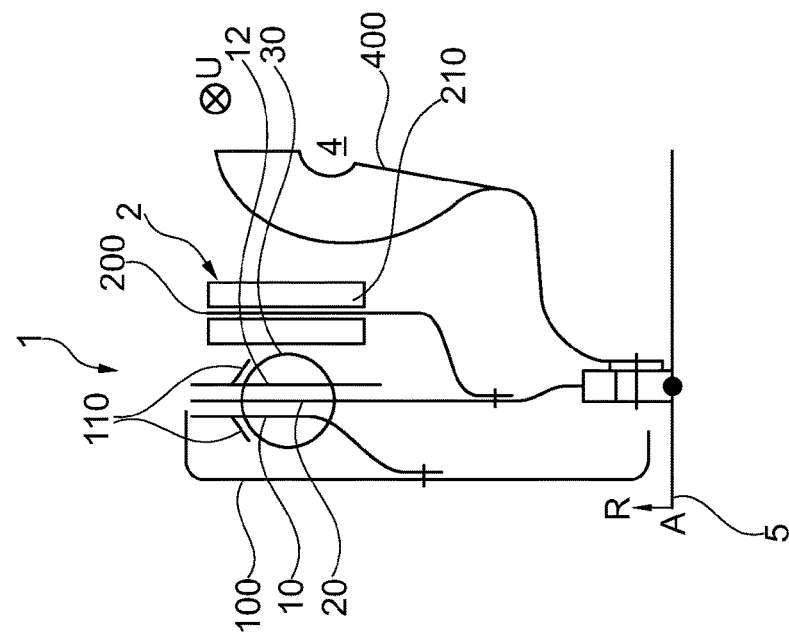
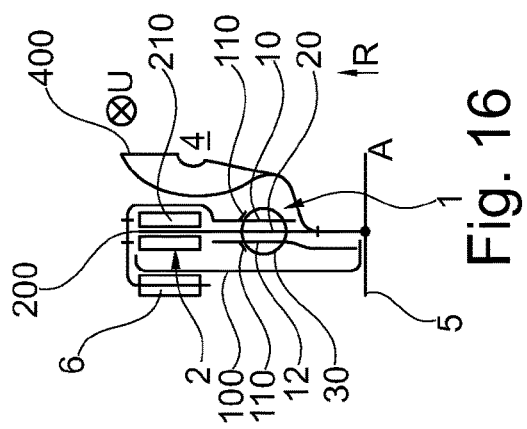
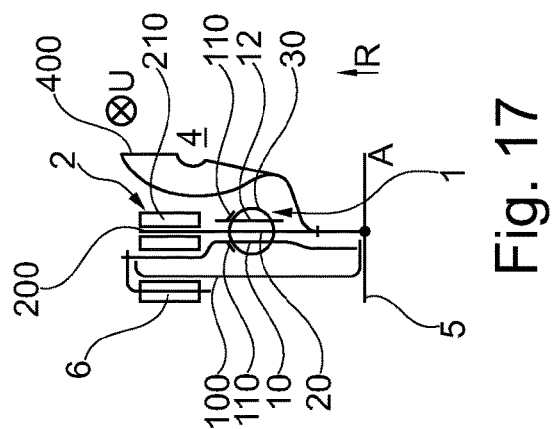

TURBINE TORSIONAL VIBRATION DAMPER, AND CONVERTER AND TORQUE TRANSMISSION DEVICE

CROSS-REFERENCE TO RELATED APPLICATIONS

The present application is the U.S. national stage application pursuant to 35 U.S.C. § 371 of International Patent Application No. PCT/DE2014/200317, filed Jul. 14, 2014, which application claims priority from German Patent Application No. 10 2013 214 688.4, filed Jul. 26, 2013, German Patent Application No. 10 2013 216 119.0, filed Aug. 14, 2013, and German Patent Application No. 10 2013 222 873.2, filed Nov. 11, 2013, which applications are hereby incorporated by reference in their entireties.

BACKGROUND OF THE INVENTION

The present invention relates to a turbine torsional vibration damper, in particular a simple torsional vibration damper, for a vehicle, preferably for a drivetrain of a motor vehicle. The invention further relates to a converter or a torque transmission device for a vehicle, in particular for a drivetrain of a motor vehicle, wherein the converter or torque transmission device has a turbine torsional vibration damper according to the invention.

On a crankshaft of a periodically operating internal combustion engine of a motor vehicle, superimposed non-uniformities of rotation occur during rotation of the crankshaft when the motor vehicle is in operation, their nature and/or frequency changing with the speed of the crankshaft. Comparatively severe non-uniformities of rotation develop during operation of the motor vehicle as torque of the internal combustion engine changes, i.e., as the demand for torque from a driver of the motor vehicle changes. Furthermore, torsional vibrations are excited in the drivetrain of the motor vehicle by combustion processes in the internal combustion engine, in particular in traction mode.

To reduce the severe non-uniformities of rotation in the drivetrain, a torsional vibration damper may be utilized, whereas a centrifugal pendulum device is able essentially to eliminate the periodic torsional vibrations in the drivetrain of the motor vehicle over a comparatively large speed range of the internal combustion engine. Torsional vibration dampers are utilized as damping devices in particular between the internal combustion engine and a transmission of the motor vehicle. Thus, torsional vibration dampers are employed, for example, in/on clutch plates of friction clutches or as dual-mass flywheels.

A torsional vibration damper and a separate centrifugal pendulum device have a comparatively large number of components, which makes their production and installation in a drivetrain of a motor vehicle time-consuming and costly. Furthermore, the construction of such a damping arrangement is comparatively expensive. Furthermore, a small axial construction space that is available specifically in small vehicles makes it increasingly problematic to design torsional vibration dampers and centrifugal pendulum devices, for which a relatively large axial construction space is needed.

SUMMARY OF THE INVENTION

One object of the invention is to make available an improved torsional vibration damper, in particular an improved simple torsional vibration damper, for a turbine of a hydrodynamic torque converter of a drive rain of a motor vehicle, in particular a converter equipped therewith or a torque transmission device equipped therewith. At the same time, the turbine torsional vibration damper improved according to the invention should require relatively little axial construction space, be simply constructed and guarantee good damping function.

The object of the invention is fulfilled by means of a turbine torsional vibration damper, in particular a simple torsional vibration damper, for a vehicle, preferably for a drivetrain of a motor vehicle; and by means of a converter or a torque transmitting device for a vehicle, in particular for a drivetrain of a motor vehicle. Advantageous refinements, additional features and/or advantages of the invention derive from subordinate claims and a following description.

The torsional vibration damper according to the invention includes a damper part for introducing a torque into the torsional vibration damper and a damper part for extracting the torque from the torsional vibration damper, there being a pendulum mass flange of a centrifugal pendulum device rigidly coupled mechanically with a damper part of the torsional vibration damper. According to the invention, the torsional vibration damper has at least two damper parts for introducing and extracting the torque, while a pendulum mass flange of a centrifugal pendulum device or the centrifugal pendulum device is connected mechanically, in particular is rigidly coupled mechanically, with at least one of the damper parts.

The converter according to the invention, or the torque transmission device according to the invention, is, for example, a rotational assembly, a hydrodynamic torque converter, a damper device, a clutch, a clutch assembly, a converter damper, a turbine damper, a dual-mass converter and/or a dual-mass flywheel, and/or combinations thereof, possibly having a hub. In this case, the converter or the torque transmitting device has a torsional vibration damper according to the invention.

In one embodiment of the invention, a pendulum mass flange is coupled mechanically on the damper input side or on the damper output side with the relevant damper part, the pendulum mass flange being rigidly coupled mechanically with the damper part in a circumferential direction of the torsional vibration damper and possibly also in an axial direction of the torsional vibration damper. The pendulum mass flange may be attached to the damper part indirectly or directly. Furthermore, the pendulum mass flange may be connected materially with the damper part in a single piece, or may be formed integrally with it.

The centrifugal pendulum device may be accommodated comparatively centrally within the torsional vibration damper, the centrifugal pendulum device being provided essentially within an axial external dimension of the torsional vibration damper on/in the actual torsional vibration damper. Furthermore, the centrifugal pendulum device may be provided essentially within an axial external dimension of an energy storage element of the torsional vibration damper on/in the torsional vibration damper.

In embodiments of the invention, the centrifugal pendulum device may be at least partially offset in the axial direction in relation to the energy storage element, the centrifugal pendulum device preferably being provided essentially at the same level next to the energy storage element. Furthermore, the centrifugal pendulum device may be offset axially and radially in relation to the energy storage element. According to the invention, the pendulum mass flange may be firmly connected to a wheel, in particular a turbine wheel, of a hydrodynamic torque converter, to a damper output part, a retainer, a damper input part and/or a piston plate, at least in the circumferential direction.

The pendulum mass flange and/or the damper output part may be located on the wheel, in particular the turbine wheel, of the torque converter. Furthermore, the pendulum mass flange and/or the damper output part may be connected non-rotatingly to the wheel, in particular the turbine wheel, of the torque converter by means of a plug connection or toothing. According to the invention, the retainer may be provided on the damper input side or damper output side of the damper input part, in particular a first side part, on the damper output part, on the piston plate, a friction lining or friction plate of a clutch, and/or separately.

According to the invention, a pendulum mass may be hung on the pendulum mass flange, the pendulum mass preferably being designed as a single or double mass. The centrifugal pendulum device may be designed as a trapezoidal centrifugal pendulum device. Furthermore, the indirect or direct attachment of the pendulum mass flange to the damper part may be accomplished by means of a weld, a fastening element, a rivet, a screw and/or by means of a plug connection or toothing. In addition, the retainer of the torsional vibration damper may be a bow spring retainer or a linear spring retainer.

According to the invention, a damper system, a damper device or a torque transmission device may be made available as a combination of a torsional vibration damper, in particular a simple torsional vibration damper, and a centrifugal pendulum device for a turbine of a torque converter. In this damper device, the torsional vibration damper and the centrifugal pendulum device are positioned in such a way that construction space in the axial direction of the drivetrain and also components can be saved, since no axial construction space has to be made available for a separate pendulum mass flange. In this case, the structural design of the damper device is comparatively simple.

BRIEF DESCRIPTION OF THE SEVERAL VIEWS OF THE DRAWINGS

The invention will be explained in greater detail in the following section on the basis of exemplary embodiments, with reference to the appended drawings. Elements or components which have an identical, unambiguous or analogous design and/or function are identified in various figures of the drawings by the same reference label. The following figures each show an embodiment of a turbine torsional vibration damper according to the invention in a schematic half-sectional view, omitting encircling edges, in which:

FIG. 9 is a schematic half-sectional view of a turbine torsional vibration damper according to the invention;

FIG. 10 is a schematic half-sectional view of a turbine torsional vibration damper according to the invention;

FIG. 11 is a schematic half-sectional view of a turbine torsional vibration damper according to the invention;

FIG. 12 is a schematic half-sectional view of a turbine torsional vibration damper according to the invention;

FIG. 13 is a schematic half-sectional view of a turbine torsional vibration damper according to the invention;

FIG. 14 is a schematic half-sectional view of a turbine torsional vibration damper according to the invention;

FIG. 15 is a schematic half-sectional view of a turbine torsional vibration damper according to the invention;

FIG. 16 is a schematic half-sectional view of a turbine torsional vibration damper according to the invention;

FIG. 17 is a schematic half-sectional view of a turbine torsional vibration damper according to the invention;

FIG. 18 is a schematic half-sectional view of a turbine torsional vibration damper according to the invention;

DETAILED DESCRIPTION OF THE INVENTION

Figure 1:
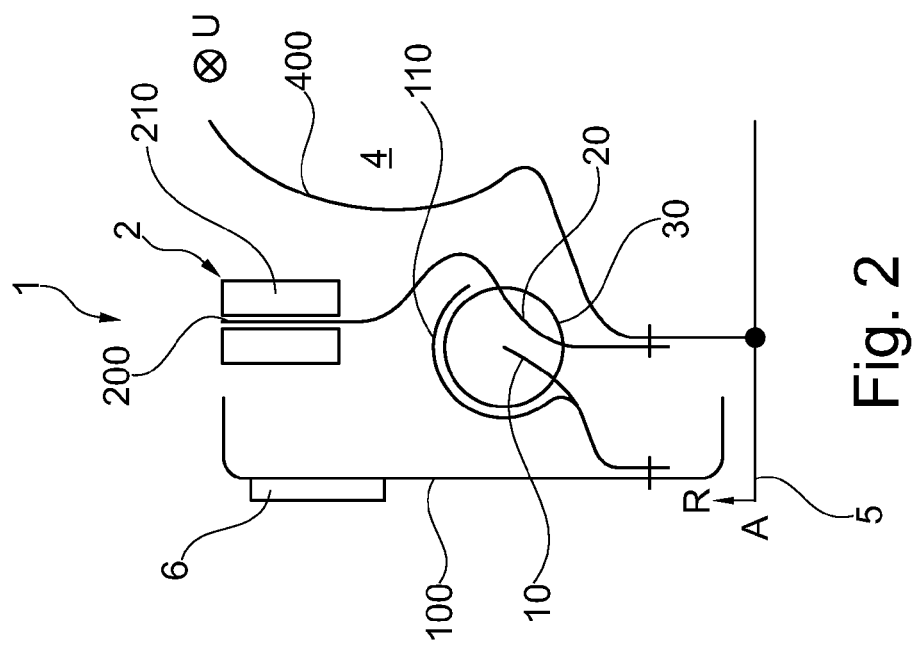
FIG. 1 is a schematic half-sectional view of a turbine torsional vibration damper according to the invention.

In FIGS. 1 through 21, respective torsional vibration damper 1, preferably designed as simple torsional vibration damper 1, is provided between piston plate 100 of a clutch (not depicted in the drawings) and turbine 400 or turbine wheel 400 of hydrodynamic torque converter 4, of which only turbine 400 is indicated in the drawing. Turbine wheel 400 transmits a torque coming from an engine shaft of an internal combustion engine (both not depicted in the drawings) indirectly or directly to transmission input shaft 5, which is illustrated in the drawings by a dot.

All that is visible of the dry- or wet-running clutch in the figures is friction lining 6 or friction plate 6. A mechanical connection of parts or functional sections of torsional vibration damper 1 according to the invention may be accomplished by a materially single-piece or integral design or connection (also referred to in the following as an attachment or solid connection), or by means of a weld or a fastening device, for example a rivet or a screw, and/or a plug connection or toothing (likewise referred to in the following as an attachment or solid connection).

FIGS. 1 through 21 show half side views of embodiments of torsional vibration damper 1 for a drivetrain of a vehicle. The drivetrain is indicated in the drawings, aside from torsional vibration damper 1, piston plate 100 and partially depicted torque converter 4, only by its axis of rotation A, which is also axial direction A of torsional vibration damper 1, torque converter 4 and transmission shaft(s) 5. The invention is naturally not limited to the depicted torsional vibration damper 1, but may be applied to all torsional dampers 1. A motor vehicle is understood also to mean a commercial vehicle, a bus, a construction machine, a motorcycle, etc.

Respective torsional vibration damper 1, preferably designed as turbine damper 1, has at least two damper parts 10, 20. Specifically, damper input part 10, preferably designed as input flange 10 and/or as first side part 10, and damper output part 20, preferably designed as hub flange 20. Furthermore, second side part 12 may be assigned to first side part 10, in which case damper part 10, 12 then has two side parts 10, 12. The particular damper part 10, 12; 20 here may be designed closed in multiple parts, or formed in a single part, a single piece, a material single piece or integrally.

According to the invention, torsional vibration damper 1 has centrifugal pendulum device 2 or centrifugal pendulum 2, which is preferably operatively connected to damper output part 20 and/or turbine wheel 400 in an indirect or direct mechanical operative connection. In this case, in particular pendulum mass flange 200 or pendulum flange 200 of centrifugal pendulum device 2 is connected, at least non-rotatingly, to damper output part 20 and/or turbine wheel 400. This attachment or solid connection may also be set up in axial direction A and/or in radial direction R of torsional vibration damper 1.

The mechanical operative connection between pendulum mass flange 200 and damper output part 20 and/or turbine wheel 400 is in particular an indirect or direct attachment by means of a weld (not depicted in the drawings), a fastening device, for example a screw (not depicted in the drawings), or a rivet, and/or by means of a plug connection or toothing. Pendulum masses 210, for example in each case two mass halves positioned axially one behind the other (double mass) or only a simple mass (single mass, not depicted in the drawings), are hung on pendulum mass flange 200 so that they can swing.

Individual construction features of the invention are explained below in greater detail on the basis of FIGS. 1 through 21, which features may be realized independently of each other and in any desired and naturally meaningful combination on/in torsional vibration damper 1 according to the invention. In each instance, only a single figure is referenced; that is, the feature may also be realized in other figures, but that is not pointed out explicitly in the description.

Figure 2:
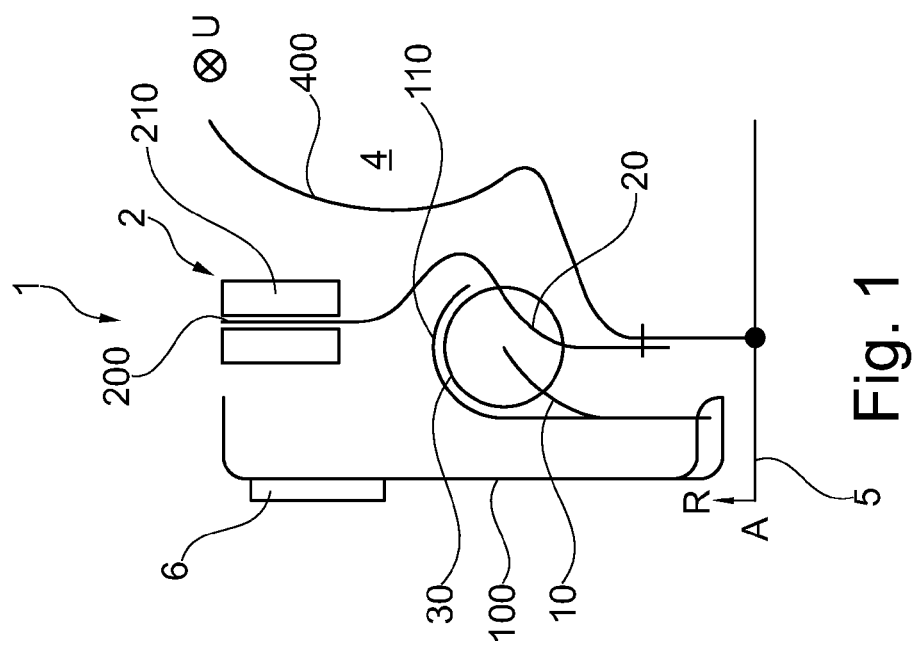
FIG. 2 is a schematic half-sectional view of a turbine torsional vibration damper according to the invention.

Thus, it is possible, for example, to attach pendulum mass flange 200 to damper output part 20 integrally, if appropriate, while damper output part 20 is firmly connected to turbine wheel 400 (FIG. 1). Retainer 110, for example bow spring retainer 110 (FIG. 1) or linear spring retainer 110 (FIG. 12), may be provided so that it is movable on piston plate 100 in axial direction A (FIG. 1), or retainer 110 may be firmly connected to piston plate 100 (FIG. 2). In this case, retainer 110 may be formed together with damper input part 10 (FIG. 1). Retainer 110 braces energy storage element 30, for example compression spring 30, in particular bow spring 30 or linear spring 30, of the torsional vibration damper in the latter's radial direction R, at least toward the outside.

Figure 3:
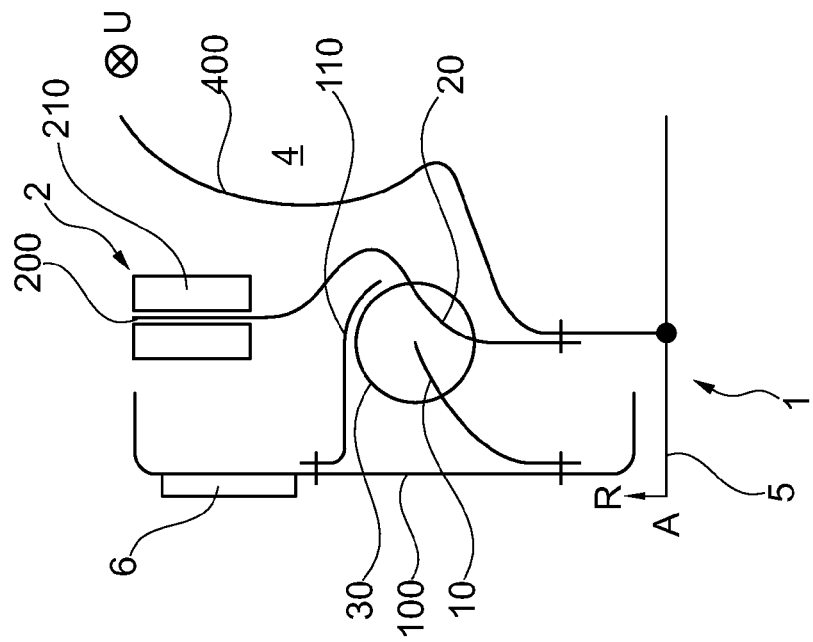
FIG. 3 is a schematic half-sectional view of a turbine torsional vibration damper according to the invention.
Figure 4:
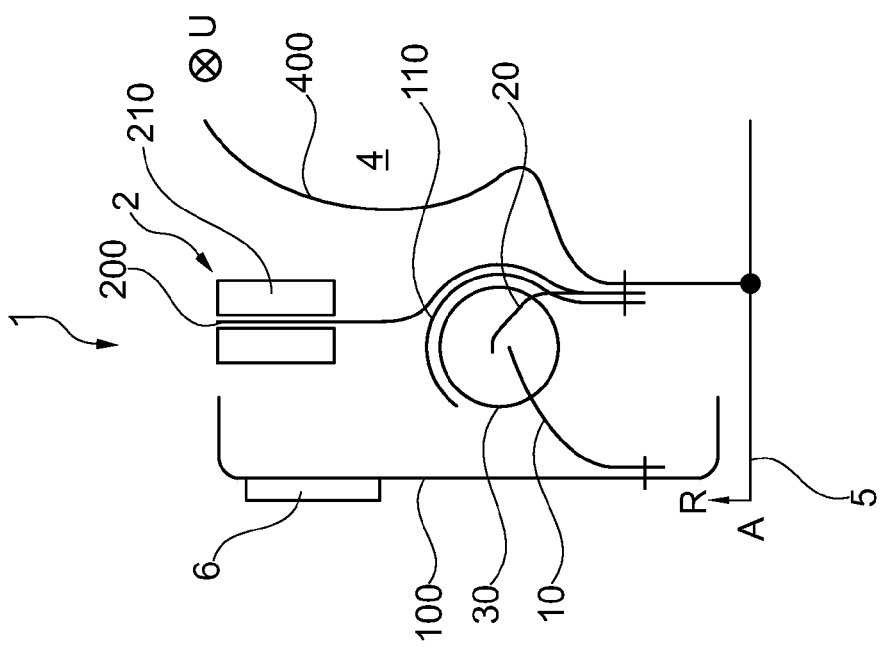
FIG. 4 is a schematic half-sectional view of a turbine torsional vibration damper according to the invention.

In addition, retainer 110 may be firmly connected to turbine wheel 400 on the damper output side, in which case this attachment may also include damper output part 20 in addition (FIG. 3). Damper output part 20 may be conceived as a flange or projection, which, emerging integrally from pendulum mass flange 200, meshes between energy storage elements 30 (FIG. 3). The same thing may apply to retainer 110. Damper input part 10 may be firmly connected to piston plate 100 (FIG. 3). Instead of a projection as damper output part 20, the latter may also be formed of a radially central section of pendulum mass flange 200 (FIG. 4). Retainer 110 may possibly be separate and possibly attached to piston plate 100 radially opposite damper input part 10 relative to energy storage element 30 (FIG. 4).

Figure 5:
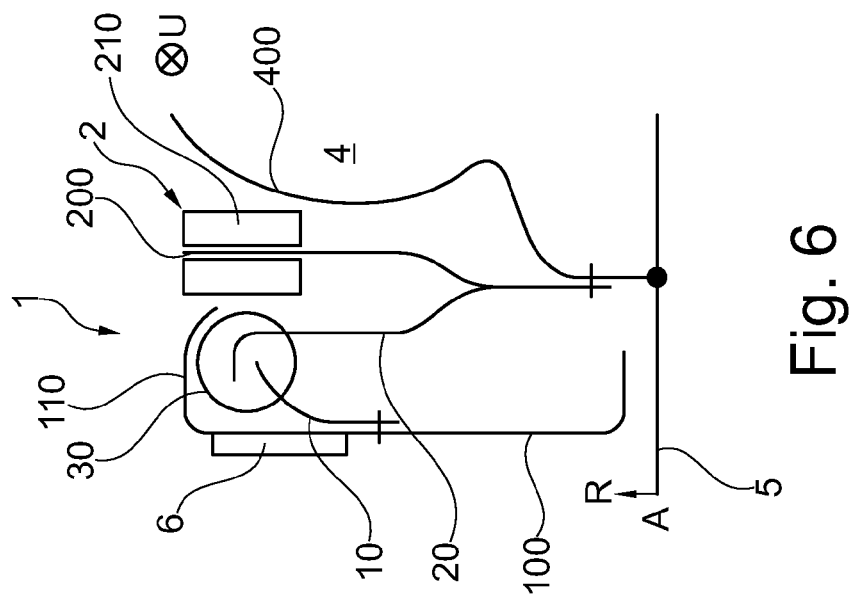
FIG. 5 is a schematic half-sectional view of a turbine torsional vibration damper according to the invention.

In the embodiments explained so far, energy storage elements 30 and pendulum masses 210 may be positioned radially one above the other, energy storage elements 30 preferably being provided to run radially on the inside and pendulum masses 210 radially on the outside, each in circumferential direction U of torsional vibration damper 1. Reversed embodiments are possible. It is naturally possible to provide a (possibly partial) axial side-by-side axial arrangement of energy storage elements 30 with pendulum masses 210 (FIG. 5), in which case a radially outer position of energy storage elements 30 and pendulum masses 210 is preferred (FIG. 5). Reversed arrangements are naturally again possible.

Figure 6:
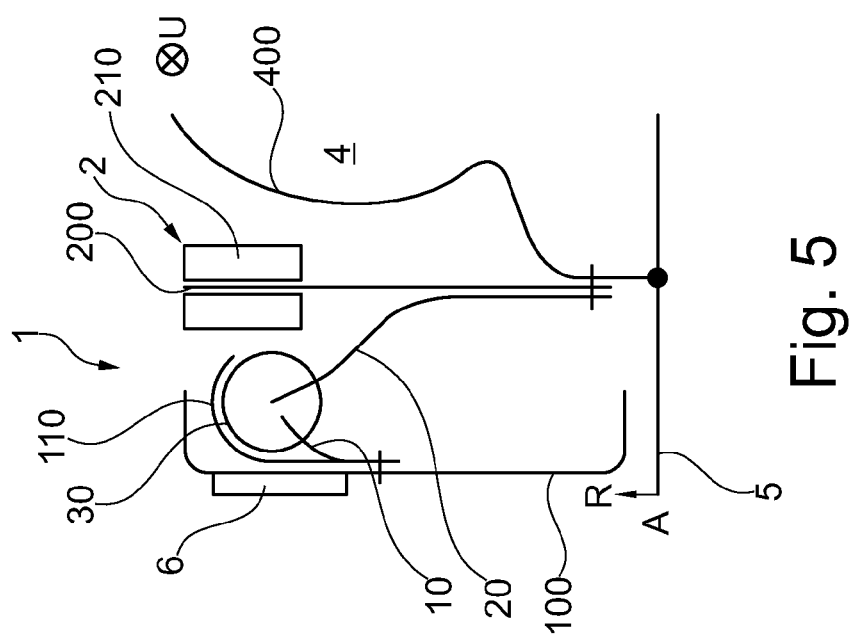
FIG. 6 is a schematic half-sectional view of a turbine torsional vibration damper according to the invention.

Piston plate 100 may assume a function of retainer 110 (FIG. 6). Furthermore, an integral design of damper output part 20 and pendulum mass flange 200 is again possible (FIG. 6). An axial position of centrifugal pendulum device 2 opposite torsional vibration damper 1 or energy storage elements 30, or vice versa, is optional in principle. It is possible both to position pendulum masses 210 between energy storage elements 30 and turbine wheel 400 (FIG. 5) and to position energy storage elements 30 between pendulum masses 210 and turbine wheel 400 (FIG. 7).

Figure 7:
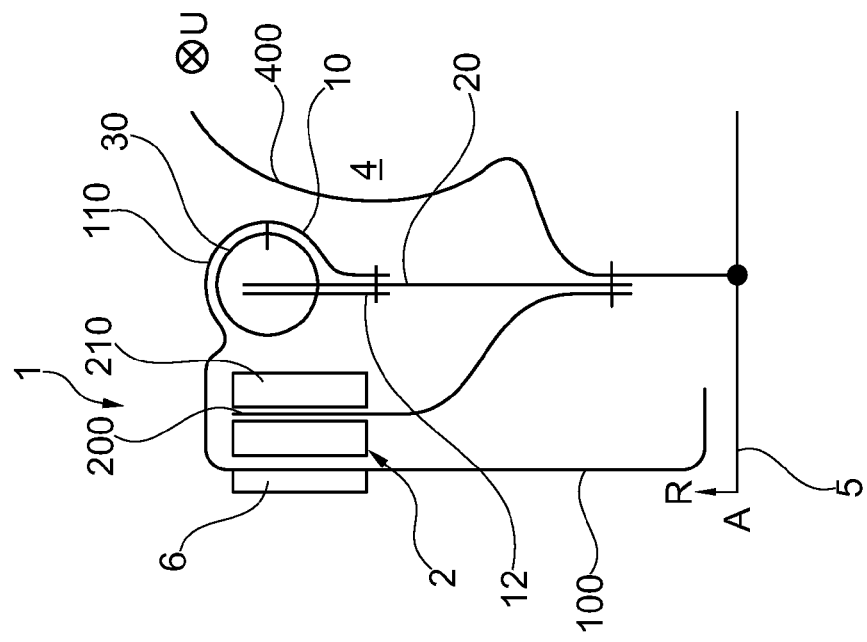
FIG. 7 is a schematic half-sectional view of a turbine torsional vibration damper according to the invention.
Figure 8:
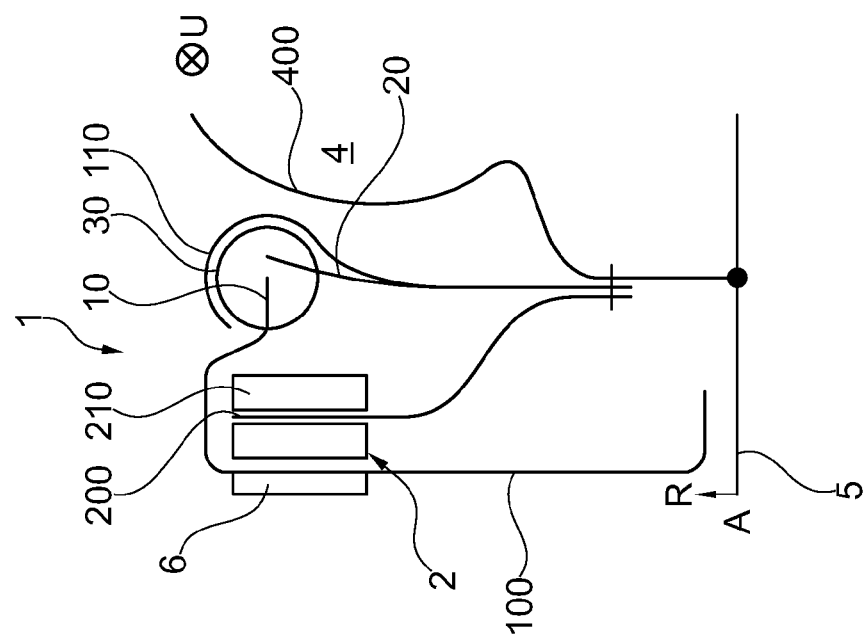
FIG. 8 is a schematic half-sectional view of a turbine torsional vibration damper according to the invention.

Damper input part 10 may possibly be attached integrally to piston plate 100 (FIG. 7), in which case damper input part 10 or piston plate 100 may bridge pendulum masses 210 (FIG. 7). At the same time, retainer 110 and damper output part 20 may be attached to each other (FIG. 7). It is also possible, however, to design the bridging of pendulum masses 210 and retainer 110 together with piston plate 100 radially on the outside (FIG. 8). At the same time, damper input part 10 may be fastened to retainer 110 (FIG. 8), in which case damper input part 10, 12 may include second side part 12 besides first side part 10 located opposite damper output part 20 (FIG. 8). Damper output part 20 may be designed in particular as a plate extending radially essentially in a straight line (FIG. 8).

A non-rotating connection of damper output part 20 with turbine wheel 400 in circumferential direction U may be achieved by means of a plug connection and/or toothing, possibly with a hub (FIG. 9), in which case turbine wheel 400 may be fixed on the hub (FIG. 9). Furthermore, instead of bow springs 30, linear springs 30 are usable as energy storage elements 30 (FIG. 9). Particularly when using linear springs 30, it is preferred to keep these radially outside of projections of two side parts 10, 12 as damper input part 10, 12 (linear spring retainer 110) (FIG. 9).

If damper output part 20 is supported axially movably, for example on a hub (FIG. 9), then damper input part 10, (12) may be fastened to piston plate 100 (FIG. 9), it being possible of course to reverse this kinematically. Attachment of first side plate 10 to piston plate 100 is possible, in which case centrifugal pendulum device 2 may be bridged (FIG. 10). At the same time, second side plate 12 may be braced indirectly (projection and/or hub of piston plate 100) on transmission input shaft 5. At the same time, bridging of centrifugal pendulum device 2 may also be avoided, in which first 10 and second side plate 12 exchange places (FIG. 11).

Damper input part 10 or first side plate 10 may be located axially movably by means of a plug connection and/or toothing on a hub (FIG. 12) to which piston plate 100 may be attached (FIG. 12). Damper input part 10 or first side plate 10 may be attached to piston plate 100 in a middle region thereof and be braced on transmission input shaft 5 inside in radial direction R indirectly (projection and/or hub of piston plate 100) or directly (FIG. 13), while second side plate 12 may be positioned axially opposite in relation to damper output part 20 (FIG. 13). It is possible to exchange the functions of first 10 and second 12 side plates by a bridging (first side part 10) of centrifugal pendulum device 2 (FIG. 14).

Damper input part 10 or first side plate 10 may be fastened to piston plate 100 by means of a separate component (FIG. 15), in which case the component may be fixed on piston plate 100 (FIG. 15). Damper input part 10 or first side plate 10 may be firmly connected to this component, at least in circumferential direction U, for example by a plug connection or toothing (FIG. 15). In this case, damper input part 10 or first side plate 10 may be supported on this component so that it is axially movable, or may be fixed thereon.

Instead of being firmly connected to piston plate 100, damper input part 10 may also be firmly connected to friction lining 6 or friction plate 6 of the dry-/wet-running clutch (FIG. 16/17), in which case this friction lining 6 or friction plate 6 may be pressed against piston plate 100. In the first case (FIG. 16), damper input part 10 bridges centrifugal pendulum device 2 (possibly second side plate 12 located inside torsional vibration damper 1), and in the second case (FIG. 17), it does not do so (possibly second side plate 12 is located outside on torsional vibration damper 1).

FIGS. 9 through 17 each show a positioning of centrifugal pendulum device 2 radially outside of energy storage elements 30 of pertinent torsional vibration damper 1. FIGS. 18 through 21, on the other hand, for their part show embodiments having a side-by-side arrangement of energy storage elements 30 of pertinent torsional vibration damper 1 and pertinent centrifugal pendulum device 2, in which case it is preferred to provide both energy storage elements 30 of particular torsional vibration damper 1 and pertinent centrifugal pendulum device 2 as far outside radially as possible.

Figure 19:
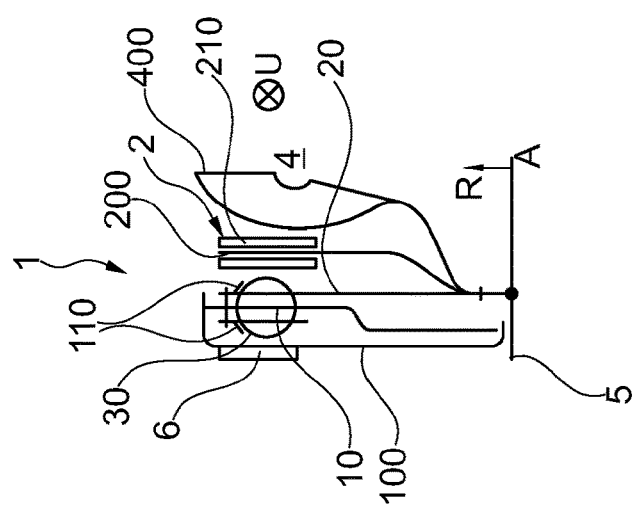
FIG. 19 is a schematic half-sectional view of a turbine torsional vibration damper according to the invention.

Thus, damper input part 10 may be attached to piston plate 100 in a center section thereof (FIG. 18). Damper output part 20 may be located axially movably on a hub for transmission input shaft 5 (FIG. 18), in which case pendulum mass flange 200 may be attached to damper output part 20 (FIG. 18) and/or turbine wheel 400 to the hub. Damper output part 20, pendulum mass flange 200 and/or turbine wheel 400 may be fastened together in an encircling area (FIG. 19). Damper output part 20, possibly instead of damper input part 10, may include two side plates (FIG. 19), in which case preferably single damper input part 10 may be positioned in particular in a central position in reference to energy storage elements 30 (FIG. 19).

Figure 20:
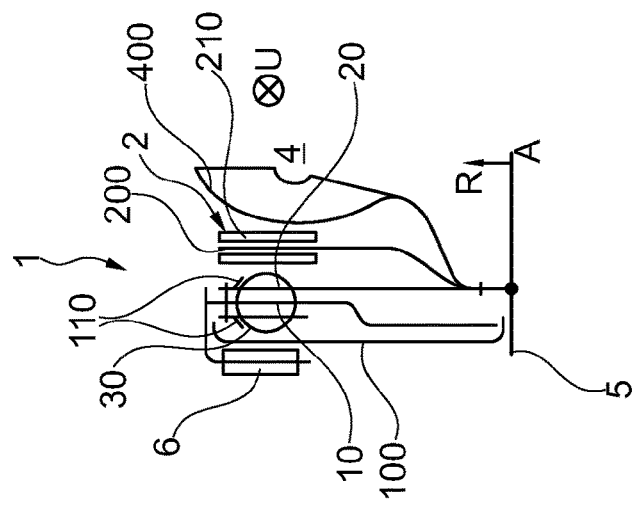
FIG. 20 is a schematic half-sectional view of a turbine torsional vibration damper according to the invention; and, FIG. 21 is a schematic half-sectional view of a turbine torsional vibration damper according to the invention.

Damper input part 10 may be fastened radially outside to piston plate 100, and be braced radially inside indirectly (projection and/or hub of piston plate 100) or directly on transmission input shaft 5 (FIG. 19). Furthermore, damper input part 10 may be firmly connected radially outside to friction lining 6 or friction plate 6 (FIG. 20), in which case this friction lining 6 or friction plate 6 may be pressed against piston plate 100. In such a case, damper input part 10 is not attached to piston plate 100 (FIG. 20).

In principle, all features of the embodiments of the invention are combinable with each other. For example, embodiments of the invention having bow spring retainer 110 (FIGS. 1 through 8 and 21 may be regarded as such) may be designed analogously to embodiments having linear spring retainer 110 (FIGS. 9 through 20 may be regarded as such). That is, a feature of torsional vibration damper 1 having bow spring retainer 110 is naturally transferable to torsional vibration damper 1 having linear spring retainer 110, and vice versa.

Figure 21:
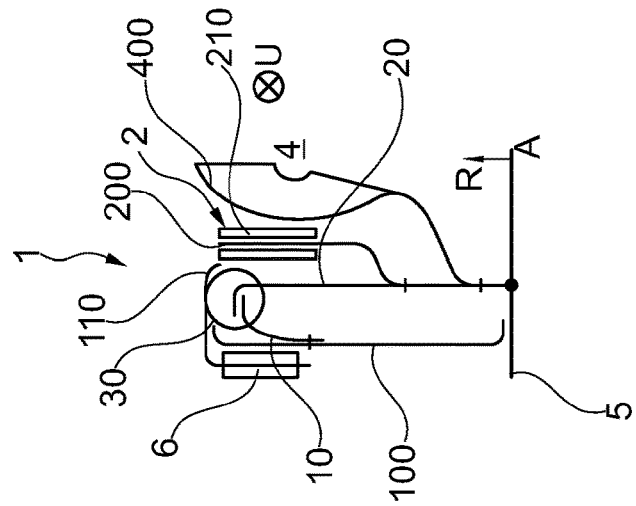

Furthermore, retainer 110 may be firmly connected radially outside to friction lining 6 or friction plate 6 (FIG. 21), in which case this friction lining 6 or friction plate 6 may be pressed against piston plate 100 (FIG. 21). Damper input part 10 and damper output part 20 are to be provided separately from retainer 110 here (FIG. 21); while damper input part 10 may be attached to the piston plate (FIG. 21).

REFERENCE LABELS 1 turbine (simple) torsional vibration damper, turbine damper (device), torque transmission device
2 centrifugal pendulum device, centrifugal force pendulum
4 (hydrodynamic} torque converter
5 transmission input shaft(s)
6 friction lining/plate of a (dry-/wet-running) clutch (not depicted in the drawing)
10 damper part, damper input part, input flange, (first) side part
12 damper part, damper input part, input flange, (second) side part
20 damper part, damper output part, hub flange (possibly two side parts)
30 energy storage element, compression spring, bow (compression) spring, linear (compression) spring
100 piston plate
110 retainer, bow spring retainer, linear spring retainer
200 pendulum mass flange, pendulum flange
210 pendulum mass, for example having two mass halves positioned one axially behind the other (dual mass) or just a simple mass (single mass)
400 turbine, turbine wheel
A axial direction or axis of rotation of drivetrain, (turbine) torsional vibration damper 1, torque converter 4, transmission shaft(s) 5
R radial direction of drivetrain, (turbine) torsional vibration damper 1, torque converter 4, transmission shaft(s) 5
U circumferential direction of drivetrain, (turbine) torsional vibration damper 1, torque converter 4, transmission shaft(s) 5

What is claimed is:

1. A turbine torsional vibration damper for a drivetrain of a motor vehicle, comprising:
    an energy storage element;
    a piston plate extending radially outward past the energy storage element;
    a damper input part non-rotatably connected to the piston plate and connected to the energy storage element;
    a damper output part connected to the energy storage element; and,
    a centrifugal pendulum device, including:
        a pendulum mass flange non-rotatably connected to the damper output part, wherein the pendulum mass flange is coupled with the damper output part on an input side of the energy storage element; and,
        one or more pendulum masses arranged radially outward of the energy storage element.

2. The turbine torsional vibration damper recited in claim 1, wherein the pendulum mass flange and the damper output part are one integral component.

3. The turbine torsional vibration damper recited in claim 1, wherein the centrifugal pendulum device is received comparatively centrally within the turbine torsional vibration damper, the centrifugal pendulum device being provided essentially within an axial external dimension of the turbine torsional vibration damper on/in the turbine torsional vibration damper, or the centrifugal pendulum device is provided essentially within an axial external dimension of the energy storage element of the turbine torsional vibration damper on/in the turbine torsional vibration damper.

4. The turbine torsional vibration damper recited in claim 3, wherein the centrifugal pendulum device is arranged at least partially offset in an axial direction in relation to the energy storage element.

5. The turbine torsional vibration damper recited in claim 3, wherein the centrifugal pendulum device and the energy storage element are at least partially aligned in an axial direction.

6. The turbine torsional vibration damper recited in claim 3, wherein the centrifugal pendulum device is arranged axially and radially offset in relation to the energy storage element.

7. The turbine torsional vibration damper recited in claim 1, wherein the pendulum mass flange is non-rotatably connected to:
a turbine wheel of a hydrodynamic torque converter; and,
a retainer.

8. The turbine torsional vibration damper recited in claim 7, wherein the pendulum mass flange and/or the damper output part is or are fixed on the turbine wheel, or the pendulum mass flange and/or the damper output part is or are non-rotatably connected to the turbine wheel by means of a plug connection or toothing.

9. The turbine torsional vibration damper recited in claim 1, further comprising a retainer non-rotatably connected to the piston plate.

10. The turbine torsional vibration damper recited in claim 1, further comprising a retainer non-rotatably connected to the damper output part.

11. The turbine torsional vibration damper recited in claim 1, wherein the one or more pendulum masses are preferably designed as a single or dual mass.

12. The turbine torsional vibration damper recited in claim 1, wherein the centrifugal pendulum device is arranged as a trapezoidal centrifugal pendulum device.

13. The turbine torsional vibration damper recited in claim 1, wherein the pendulum mass flange is connected to the damper output part by one of a weld, a fastening means, a rivet, a screw, a plug connection, and toothing.

14. The turbine torsional vibration damper recited in claim 1, wherein the turbine torsional vibration damper includes a bow spring retainer non-rotatably connected to the damper output part.

15. The turbine torsional vibration damper recited in claim 1, wherein the turbine torsional vibration damper includes a linear spring retainer non-rotatably connected to the damper output part.

16. The turbine torsional vibration damper recited in claim 1, wherein the damper output part is directly connected to the energy storage element.

17. A turbine torsional vibration damper for a drivetrain of a motor vehicle, comprising:
an energy storage element;
a piston plate extending radially outward past the energy storage element;
a damper input part non-rotatably connected to the piston plate and connected to the energy storage element;
a retainer non-rotatably connected to the piston plate, the retainer being separate from and non-integral to the damper input part;
a damper output part connected to the energy storage element; and,
a centrifugal pendulum device, including:
a pendulum mass flange non-rotatably connected to the damper output part; and,
one or more pendulum masses arranged radially outward of the energy storage element.

18. A turbine torsional vibration damper for a drivetrain of a motor vehicle, comprising:
an energy storage element;
a piston plate extending radially outward past the energy storage element;
a damper input part non-rotatably connected to the piston plate and connected to the energy storage element;
a damper output part directly connected to the energy storage element;
a retainer non-rotatably connected to the damper output part; and,
a centrifugal pendulum device, including:
a pendulum mass flange non-rotatably connected to the damper output part; and,
one or more pendulum masses arranged radially outward of the energy storage element.

* * * * *